Figure 1:
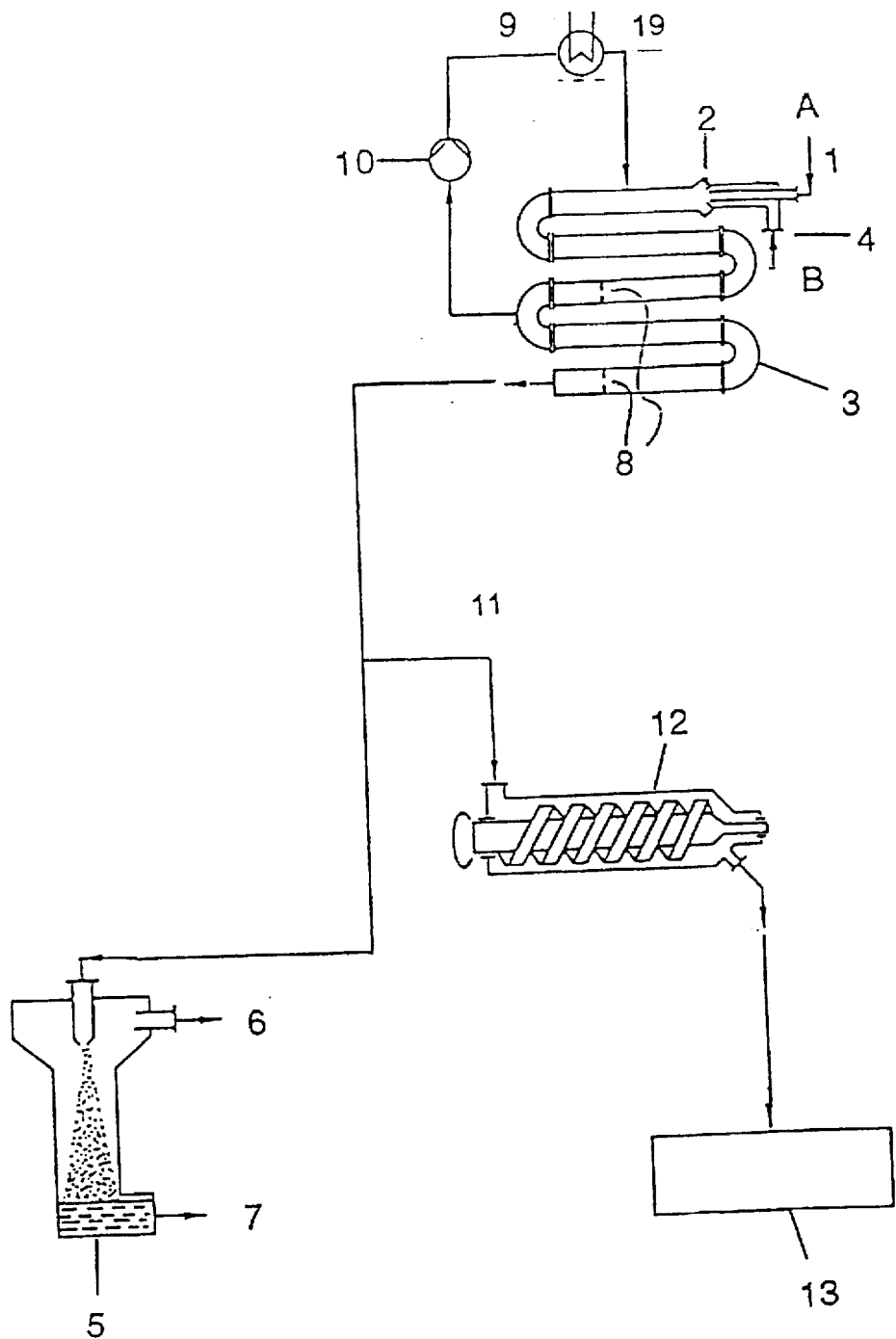

United States Patent [19]

Groth et al.

[11] Patent Number: 5,594,077

[45] Date of Patent: *Jan. 14, 1997

[54] PROCESS FOR PREPARING POLYMERS WHICH CONTAIN ASPARTIC ACID

[75] Inventors: Torsten Groth; Winfried Joentgen, both of Köln; Paul Wagner, Düsseldorf; Hans-Joachim Traenckner, Leverkusen; Dorde Jovcic, Burscheid, all of Germany

[73] Assignee: Bayer AG, Leverkusen, Germany

[*] Notice: The term of this patent shall not extend beyond the expiration date of Pat. No. 5,493,004.

[21] Appl. No.: 328,868

[22] Filed: Oct. 25, 1994

[30] Foreign Application Priority Data

Nov. 2, 1993 [DE] Germany .......................... 43 37 337.2
Jul. 21, 1994 [DE] Germany .......................... 44 25 951.4

[51] Int. Cl.$^6$ ................................................. C08G 69/00
[52] U.S. Cl. .......................... 525/451; 528/363; 528/345; 422/131
[58] Field of Search ................................ 528/363, 345; 525/451

[56] References Cited

U.S. PATENT DOCUMENTS

| | | | |
|---|---|---|---|
| 2,306,918 | 12/1942 | Weiss et al. | 260/78 |
| 2,459,964 | 1/1949 | Robinson et al. | 260/534 |
| 3,052,655 | 9/1962 | Fox et al. | 260/78 |
| 3,846,380 | 11/1974 | Fujimoto et al. | 260/78 A |
| 4,169,924 | 10/1979 | Barabas et al. | 525/377 |
| 4,590,260 | 5/1986 | Harada et al. | 528/328 |
| 4,696,981 | 9/1987 | Harada et al. | 525/328 |
| 4,839,461 | 6/1989 | Boehmke | 528/363 |
| 4,996,292 | 2/1991 | Fox et al. | 528/328 |
| 5,057,597 | 10/1991 | Koskan | 528/328 |
| 5,116,513 | 5/1992 | Koskan et al. | 210/698 |
| 5,142,062 | 8/1992 | Knebel et al. | 548/545 |
| 5,152,902 | 10/1992 | Koskan et al. | 210/698 |
| 5,211,733 | 6/1993 | Koskan et al. | 530/333 |
| 5,219,952 | 6/1993 | Koskan et al. | 525/419 |
| 5,268,437 | 12/1993 | Holy et al. | 526/229 |
| 5,284,512 | 2/1994 | Koskan et al. | 106/416 |
| 5,288,783 | 2/1994 | Wood | 525/418 |
| 5,292,858 | 3/1994 | Wood | 528/345 |
| 5,292,864 | 3/1994 | Wood et al. | 528/490 |
| 5,296,578 | 3/1994 | Koskan et al. | 528/363 |
| 5,319,145 | 6/1994 | Paik et al. | 528/328 |
| 5,328,631 | 7/1994 | Du Vosel et al. | 252/174.23 |
| 5,367,047 | 11/1994 | Wood | 528/363 |
| 5,393,868 | 2/1995 | Freeman et al. | 528/480 |
| 5,410,017 | 4/1995 | Bortnick et al. | 528/363 |
| 5,493,004 | 2/1996 | Groth et al. | 528/363 |

FOREIGN PATENT DOCUMENTS

| | | |
|---|---|---|
| 256366 | 2/1988 | European Pat. Off. . |
| 0549968 | 7/1993 | European Pat. Off. . |
| 561452 | 9/1993 | European Pat. Off. . |
| 578448 | 1/1994 | European Pat. Off. . |

(List continued on next page.)

OTHER PUBLICATIONS

Orbit Abstract of DE 37 24 460 (Feb. 4, 1988).
Orbit Abstract of EP 0 256 366 (Feb. 24, 1988).

(List continued on next page.)

Primary Examiner—Mark Nagumo
Attorney, Agent, or Firm—Connolly & Hutz

[57] ABSTRACT

In a process for the continuous preparation of polymers with repeating succinyl units, maleic anhydride or a derivative thereof as educt A is mixed with ammonia or an ammonia-producing compound or amides of carbonic acid as educt B and in a first reaction stage these are reacted to give an N-containing low molecular derivative of maleic acid. This derivative is then polymerized in a subsequent second reaction stage. Reaction of the educts (A,B) takes place largely adiabatically in the first reaction stage. The heat of reaction thereby released is used to take the reaction mixture to the polymerization temperature and in the second reaction stage at least partially to polymerize the N-containing low molecular derivative to obtain a polymer with repeating succinyl units.

31 Claims, 3 Drawing Sheets

FOREIGN PATENT DOCUMENTS

| | | |
|---|---|---|
| 578450 | 1/1994 | European Pat. Off. . |
| 593187 | 4/1994 | European Pat. Off. . |
| 592265 | 4/1994 | European Pat. Off. . |
| 608160 | 7/1994 | European Pat. Off. . |
| 3626672 | 2/1988 | Germany . |
| 3724460 | 2/1988 | Germany . |
| 4300020 | 7/1994 | Germany . |
| 1404814 | 9/1975 | United Kingdom . |
| 2246786 | 2/1992 | United Kingdom . |
| WO92/14753 | 9/1992 | WIPO . |
| WO92/16462 | 10/1992 | WIPO . |
| WO92/16463 | 10/1992 | WIPO . |
| WO93/23452 | 11/1993 | WIPO . |
| WO94/14939 | 7/1994 | WIPO . |

OTHER PUBLICATIONS

Orbit Abstract of DE 36 26 672 (Feb. 11, 1988).

Orbit Abstract of EP 0 549 968 (Jul. 7, 1993).

Orbit Abstract of DE 43 00 020 (Jul. 7, 1994).

Kovacs et al., *Chemical Studies of Polyaspartic Acids*, Journal of Organic Chemistry, vol. 26, pp. 1084–1091 (1960).

Sarig et al., *The Use of Polymers for Retardation of Scale Formation*, Natl. Counc. Res. Dev., [Rep.] NCRD (Isr.) pp. 150–157 (1977).

Dessaignes, Chimie Organique, *Nouvelles recherches sur la production de l'acide succinique au moyen de la fermentation;* C.R. 31. pp. 432–433, (1850) (The orginal French language version–translation at AM).

Orbit Abstract of JP–A–60 197 646 (Nippon Shokubai Kagaku Kogyo KK) 7 Oct. 1985.

Harada, Polycondensation of Thermal Precursors of Aspartic Acid, Journal of Org. Chem., vol. 24 pp. 1662–1666 (1959).

Chemical Abstracts, vol. 111, No. 6, 7 Aug. 1989, Columbus, Ohio, US; abstract No. 40111d, *Zusammenfassung* & JP–A–63 270 735 (Koei Chemical) 8 Nov. 1988.

Dessaignes, Quarterly Journal of the Chemical Society of London, vol. III, reprinted 1950. Translation of Comp. Rend. XXX, 324.

PROCESS FOR PREPARING POLYMERS WHICH CONTAIN ASPARTIC ACID

The invention relates to a process for the continuous preparation of polymers with repeating succinyl units in which maleic anhydride or a derivative thereof (educt A) is reacted with ammonia, an ammonia producing compound or amides of carbonic acid (educt B). The PSI-containing polymers may then be hydrolysed to give polymers which contain aspartic acid. Copolymers of polysuccinimide (PSI) can be prepared by adding comonomers. The invention also relates to a continuous process for preparing maleamic acid.

The preparation and use of polyaspartic acid (PAA) and its derivatives has been the object of numerous publications and patents for a long time.

According to J. Org. Chem. 24, p. 1662–1666 (1959) polysuccinimide, which is called "anhydropolyaspartic acid" there, is obtained by thermal polycondensation of maleamic acid, monoammonium maleate at temperatures of up to 200° C. The polymer yields are 75% to 79% at 200° C. Furthermore, malic acid, maleic anhydride, fumaric acid and asparagine are mentioned as possible starting materials.

The preparation can also take place by polycondensation of aspartic acid, according to J. Org. Chem. 26, 1084 (1961). Polysuccinimide (PSI) is initially formed as an intermediate, this also being called "anhydropolyaspartic acid" in this paper. PSI can be converted into PAA by hydrolysis.

U.S. Pat. No. 4,839,461 (=EP-A 0 256 366) describes the preparation of polyaspartic acid from maleic anhydride, water and ammonia. Maleic anhydride is converted into the monoammonium salt by adding concentrated ammonia solution in aqueous medium and then the water is evaporated out of solution. The monoammonium salt is polymerised in bulk. During this polymerisation, the material is initially highly viscous and then solid/porous, which requires complicated handling from a technical point of view.

U.S. Pat. No. 4,590,260 discloses that amino acids can be polycondensed together with derivatives of malic, maleic and/or fumaric acid at 100° to 225° C. According to U.S. Pat. No. 4,696,981, microwaves can be successfully used to perform this type of reaction.

DE-A 2 253 190 describes a process for preparing polyamino acid derivatives, especially polyaspartic acid derivatives. Accordingly, apart from aspartic acid, maleic acid derivatives (monoammonium salt and monoamide) are thermally polymerised to give PSI in an intermediate stage and this is subsequently reacted with amines in suitable solvents to give the desired polyamino acid derivatives.

U.S. Pat. No. 5,296,578 describes the preparation of PSI from maleic anhydride, water and ammonia. Maleic anhydride is hydrolysed in water to give maleic acid and then converted into the ammonium salt with conc. ammonia solution. The water is evaporated out of solution in a stirred reactor and then the monoammonium salt is polymerised in bulk to give PSI at temperatures of more than 170° C. In this case, the material is reacted for several hours in a highly viscous phase to give solid PSI and then hydrolysed to give PAA.

U.S. Pat. No. 5,288,783 describes the preparation of PAA from maleic acid or fumaric acid, water and ammonia. Maleic anhydride is thoroughly mixed with water in a stirred tank and converted to maleic acid with cooling. The monoammonium salt of maleic acid is prepared by the addition of ammonia solution. Then the water is evaporated and the dry monoammonium salt is polymerised at temperatures of 190° to 350° C. Alternatively, it is proposed that the monoammonium salt present in aqueous solution is further processed by extrusion at temperatures of 160° to 200° C. to give PSI. The PSI prepared by either route is then hydrolysed in alkaline medium to give PAA. EP-A 593 187 describes the preparation of PSI by thermal polymerisation of maleamic acid at temperatures of 160° to 330° C. over a reaction time of 2 minutes to 6 hours. Here again, reference is made to polycondensation in solvents with the use of condensation aids.

DE-A 4 221 875 describes the preparation of modified polyaspartic acids by polycondensation and their use as additives for detergents, cleansing agents and water-treatment agents and for preventing the formation of a coating when boiling down sugars.

This application spectrum for PAA is also known from other Patents. Thus PAA can be used, according to EP-A 256 366 (=U.S. Pat. No. 4,839,461) for preventing and removing incrustations due to the components which harden water ("scale inhibition" and "scale deposition removal"). According to U.S. Pat. No. 5,116,513, EP-A 391 629 and EP-A 454 126, PAA and its salts are active components in detergents and cleansing agents. PAA is also mentioned as a bone-substitute material in EP-A 383 568.

In the known processes, the starting products for thermal polymerisation to PSI and similar materials are initially prepared largely isothermally in stirred tanks and these are then polymerised in bulk at temperatures between 140° and 350° C. for a long time (mostly several hours) or in solvents. Maleic acid, maleic anhydride, fumaric acid or maleamic acid, with water and ammonia, are used as educts. The monoammonium salt of maleic acid is mostly mentioned as an intermediate in the preparation of PSI. The processes described are complicated from a process engineering point of view due to having to handle a viscous phase during thermal polymerisation or because auxiliary substances which do not participate in the reaction are required for thermal polymerisation and these then have to be removed from the product PSI or from PSI hydrolysed to PAA. Furthermore, these processes mean that the residence time in the reaction zone is very extended as a result of the complicated handling procedure..The prolonged exposure to heat can lead to secondary and side reactions such as, for instance, decarboxylation. In particular, the proposed processes are energetically unfavourable.

There is, therefore, the object of developing a new process for the continuous preparation of polymers with repeating succinyl units which ensures as rapid a thermal polymerisation as possible, in a manner which is cost-beneficial and easy to perform, while avoiding the use of auxiliary substances which do not participate in the reaction and which then have to be eliminated at some expense, i.e. a process which is simple and makes extensive use of the heat of reaction from the primary step. In addition, the reaction time should be greatly reduced in comparison with the prior art and a constant quality should be guaranteed due to the continuous method of working.

The invention is based on a process for preparing polymers with repeating succinyl units in which maleic anhydride or a derivative thereof (educt A) is reacted with an ammonia-producing compound or ammonium salts or amides of carbonic acid (educt B) to give an N-containing low molecular derivative of maleic acid in a first exothermic reaction step and this derivative is polymerised in a subsequent second reaction step.

The solution to the problem mentioned above, according to the invention, is characterised in that the reaction of the educts (A,B) in the first reaction step takes place largely adiabatically and the heat of reaction thereby released is used in a second reaction step to at least partially polymerise the N-containing low molecular derivative to obtain a polymer with repeating succinyl units.

In addition to maleic anhydride, maleic acid, fumaric acid or malic acid are preferred as educt A.

In addition to ammonia, an ammonia-producing compound, in particular ammonium hydrogen carbonate or diammonium carbonate or ammonium salts and amides of carbonic acid, such as urea, isourea (ammonium cyanate), carbamic acid or ammonium carbamide are suitable as educt B. These educts may be used separately or as a mixture in bulk or in solution.

Maleic anhydride or its derivatives are used as a melt in a preferred embodiment.

The reaction between the educts may optionally be performed in the presence of a solvent suitable solvents are water, polar aprotic solvents such as dimethylformamide, N-alkylpyrrolidone, sulpholane, acetone, etc., polyalkylene glycols, polyalkylene glycol monoalkyl ethers and polyalkylene glycol dialkyl ethers. Supercritical gases such as carbon dioxide are also suitable. Water is particularly suitable.

In a preferred embodiment, the educts are molten maleic anhydride (educt A) and ammonia solution, in particular an aqueous ammonia solution (educt B).

Maleic anhydride or derivatives thereof are preferably used as educt A in amounts such that the molar ratio of nitrogen in educt B relative to maleic anhydride or a derivative thereof in educt A is between 0.1 and 5.0, preferably between 0.5 and 4.0 and in particular between 0.9 and 3.0.

The first reaction stage is a rapid reaction, the result of which, in the event of non-specific reaction management, may be the production of undesired side products due to simultaneous and consecutive reactions.

Reduction of undesired side products in complex reaction systems of several simultaneous and consecutive reactions by micro-mixing the educts, which must take place more rapidly than the educts react with each other, is known from the literature (Ullmann: Encyclopedia of Industrial Chemistry, 1992, vol. B2, Chap 24; J. R. Bourne, H. Maire, Chem. Eng. Process 30 (1991) 23–30). If the rates of chemical reaction and the rates of mixing of the educts are of the same order of magnitude, then there are complex interactions between the reactions and the local mixing behaviour as determined by the turbulence in the reactor and at the mixing device. If the rates of reaction are much more rapid than the rates of mixing, then the yields are clearly affected by the mixing process, i.e. by the local rate and concentration fields of the reactants and thus on the construction of the reactor and the structure of the turbulence (see e.g. R. S. Brodkey, Turbulence in Mixing Operations—Theory and Application to Mixing and Reaction, Academic press, New York 1975).

Suitable devices for sufficiently rapid mixing of two liquids are known from many literature references and patents (e.g. Ullmann: Encyclopedia of Industrial Chemistry, 1982, vol. B2, Chap. 25; vol. B4, 561–586; Perry's Chemical Engineers' Handbook, 6th ed. (1984), McGraw-Hill, New York, 21–61; M. H. Pohl, E. Muschelknautz, Chem. Ing. Tech. 51 (1979), 347–364; Chem. Ing. Tech. 52 (1980), 295–291).

Preferred devices for rapid mixing of educt streams are all types of a) jet mixers b) static mixers c) dynamic mixers.

Particularly preferred devices for the rapid mixing of educts and for starting exothermic reactions are jet mixers, whose further advantages include the ability to be hermetically sealed, variable adjustable mixing energy and the general plug-flow characteristic.

In a preferred embodiment the educts are mixed in a high-speed mixing apparatus of the type mentioned above during the performance of the 1st reaction stage, to reduce undesired side reactions, and exothermic formation of the intermediate products is performed in parallel or afterwards. The heat thereby released is essentially stored in the educt/intermediate mixture. The reaction mixture is thus heated to the polymerisation temperature and optionally the organic solvent or water as well as water being produced during reaction is completely or at least partially evaporated.

In a specially preferred embodiment, mixing takes place in <2 s and exothermic formation of the intermediates takes place in less than 60 s.

The reaction mixture resulting from the first reaction stage is then polymerised in a suitable apparatus.

Any apparatus which enables the minimum residence time required for polymerisation with a very narrow distribution of residence times for the viscous liquid phase and at the same time enables at least partial evaporation of the solvent, in particular water, and of the water formed during reaction, is basically suitable for the thermal polymerisation reaction.

During the known production of PSI from maleic acid or a derivative thereof and ammonia, gaseous or liquid, urea, isourea, ammonium cyanate, carbamic acid, ammonium carbamide, ammonium hydrogen carbonate, diammonium carbonate and mixtures of the previously mentioned substances in bulk or in solution, in particular in aqueous solution, a complex reaction system with many simultaneous and consecutive reactions is produced. To maximise the product yield and thus to reduce undesired polymeric components in such a complex reaction system with undesired simultaneous and consecutive reactions, it is known in principle that micro-mixing the educts must take place more rapidly than the educts react with each other (e.g. K. H. Tebel, H-O. May; Chem.-Ing.-Tech. 60 (1988) and MS 1708/88; J. R. Bourne, H. Maire; Chem. Eng. Process, 30 (1991) p. 23 et seq.; R. S. Brodkey; Chem. Eng. Commun. 8 (1981) p. 1 et seg.)

Furthermore, to build up polymer chains with uniform chain lengths, thermal polymerisation must be performed in the same residence time and under as identical reaction conditions as possible for all the molecules. Suitable reactors with a narrow range of residence times are known from the relevant literature (e.g. Ullmann:

Encyclopedia of Industrial Chemistry, 1992, vol. B4, 97–20).

Preferred devices for thermal polymerisation are thus any apparatus which has a defined residence time with a narrow distribution of residence times for the solid or highly viscous liquid phase and at the same time enables a constant temperature by means of at least partial evaporation of the solvent (org. solvent and/or water) and/or the reaction water formed during polymerisation. This type of preferred device may be, for example, a) retention tubes b) high viscosity reactors (e.g. screw, list reactor)

c) dryers (e.g. paddle dryer, spray dryer)

d) stirred tank cascades e) thin layer evaporators f) multi-phase spiral tube reactors (MPSR) (DT 1 667 051, DE 219 967).

Particularly good results are obtained when the educts (A, B) are fed to a jet mixer which is connected in series with a tubular reactor or an MPSR. This combination apparatus has proved particularly good for performing the process according to the invention.

To regulate the reactor temperature for the reactions performed, complete or partial recycling of the reaction mixture in combination with the abstraction of heat may take place. Any reactor of the type mentioned above with recycling of the reaction mixture combined with abstraction of heat and all paddle reactors are particularly suitable for this type of reaction procedure.

In another variant of the process according to the invention, one educt component may be introduced in an appropriate manner at several places along the tubular or multiphase spiral tube reactor to avoid too rapid and large an increase in temperature of the reaction mixture due to the highly exothermic and rapid reaction leading to the formation of maleamic acid, so that an optimal temperature profile may be produced. This avoids the production of temperature peaks (overheating) which could lead to product damage. The number of additional introduction points (not counting the feed point in the mixing nozzle at the tubular or multiphase spiral tube reactor inlet) is preferably in the range up to 10. The type of feeding is selected to ensure good mixing with the reaction solution.

The educts may be mixed at temperatures between 0° C. and 200° C., depending on the educts used. The exothermic adiabatic reaction in the first reaction stage then supplies sufficient heat for the second reaction stage to take place at 120° to 500°C., preferably at 140° to 450° C. and in particular at 140° to 400° C., depending on the type and concentration of the educts used. The temperature is advantageously adjusted via the pressure in the reactor and the mass-flow of the educts (A,B) introduced, as well as the amount of organic solvent and/or water. To support temperature management during reaction, cooling and heating media may also be used. Furthermore, product/educt regions with different temperatures in the reaction system may be placed in contact, directly or indirectly, for the purpose of heat exchange.

The residence times of the educts mentioned above, in the reactor system described above, are up to 120 minutes. Residence times of up to 30 minutes are preferred. Decreasing residence times with increasing temperature are particularly preferred, i.e. less than 30 minutes at temperatures between 120° and 200° C.; less than 10 minutes at temperatures between 200° and 250° C.; less than 5 minutes at temperatures between 250° and 300° C.; less than 2 minutes at temperatures above 300° C.

The residence time in the reactor system is preferably selected so that virtually complete reaction of educt A which is used in less than equivalent amounts, preferably maleic anhydride, is ensured. For virtually complete polymerisation it may be necessary to transfer the monomer and oligomer mixture obtained shortly after mixing in the first reaction zone, particularly preferably in a tubular reactor, to another of the devices mentioned above, preferably a high viscosity reactor. Particularly preferably, however, this type of high viscosity reactor may not be used and complete PSI formation may be performed in a retention tube, preferably in an MPSR. The reaction products obtained are hot solutions or solvent-containing or water-containing melts, depending on the water or solvent content, due to the heat of reaction which is released. The heat of reaction may largely be used in the reactor. This means that optimal heat management with low investment and operating costs is achieved in an industrial plant, which leads to a high degree of economic viability.

When using PSI oligomer-containing melts in a high viscosity reactor, the rate of reaction may be increased considerably in a preferred reaction management scheme, in contrast with direct synthesis from the educts maleic acid/ammonium salt or maleamic acid in such a device, because the viscous material has already been pre-heated and partially depleted of solvent by evaporation as a result of the heat of reaction being released. The residence time when using this method of working is considerably reduced as compared with the prior art.

The polymers produced by the process according to the invention have repeating succinyl units with the following structures:

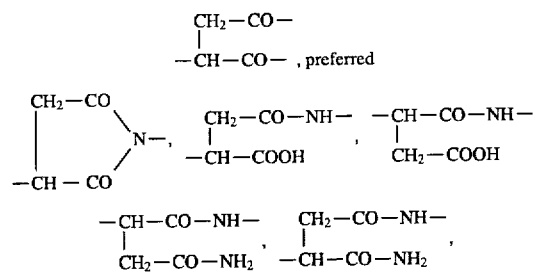

In addition, further repeating units may be contained, by means of appropriate reaction management and selection of educts, e.g.

a) malic acid units of the formula

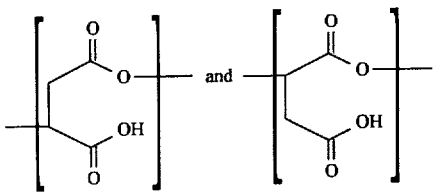

b) maleic acid and fumaric acid units of the formula

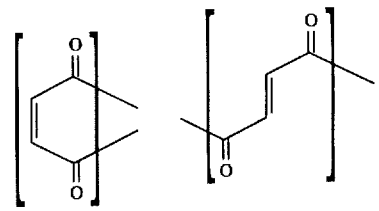

Analysis of the chemical structure is preferably performed using $^{13}$C NMR, FTIR and after total hydrolysis by using HPLC, GC and GC/MS.

In accordance with a further development of the invention, the structure of the polysuccinimide obtained may be affected by the stoichiometric ratio of the educts. If in particular the educts maleic anhydride and ammonia are used with a molar excess of ammonia, then a polymer is obtained with repeating succinyl units:

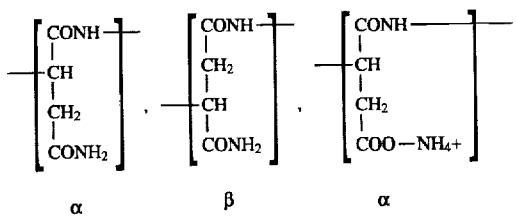

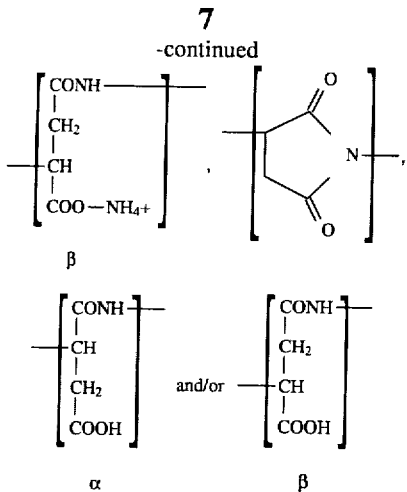

In this case, 1.8 to 25.0, preferably 2.0 to 10.0 moles, in particular 2 to 5 moles of ammonia are preferably used per mole of maleic anhydride.

The polymerisation products can be converted to a PAA-containing salt by reaction with a base optionally in the presence of water. This conversion of PSI-containing into PAA-containing polymers by hydrolysis takes place subsequently in a suitable device. Preferably, a pH of between 5 and 14 is suitable here. In a particularly preferred form, a pH of 7 to 12 is selected, in particular by adding a base. Suitable bases are alkali metal and alkaline earth metal hydroxides or carbonates such as for example, caustic soda solution, caustic potash solution, soda or potassium carbonate, ammonia and amines such as triethylamine, triethanolamine, diethylamine, diethanolamine, alkylamines, etc.

The temperature during hydrolysis is appropriately in the range up to and including the boiling point of the PSI suspension and is preferably 20° to 150° C. Hydrolysis is optionally performed under pressure.

It is also possible, however, to obtain free polyaspartic acid by purely aqueous hydrolysis or by treatment of the salt with acids or acid ion exchangers. In the present invention, the expession "polyaspartic acid" (=PAA) also includes the salts, if not expresssly stated otherwise. The final product is obtained by drying, prefereably spray-drying.

The polymers which are prepared have different chain lengths and molecular weights, according to gel permeation chromatography analyses, depending on the reaction conditions, for example the residence time and temperature of thermal polymerisation, (Mw=500 to 10,000, preferably 700 to 5,000, in particular 1,000 to 4,500). In general, the proportion of beta-form is more than 50%, preferably more than 70%.

Polyaspartic acids according to the invention may be used as an additive in low-phosphate and phosphate-free detergents and cleansing agents. The polymers are builders for detergents and act by reducing the incrustation and greying of textiles being washed, during the wash process.

Furthermore, polyaspartic acids according to the invention are suitable as water treatment agents. They may be added to water in cooling circuits, evaporators or sea-water desalination plants. In addition, they may be used as coating inhibitors during the concentration by boiling down of sugar juice.

As a result of their good dispersant properties, polyaspartic acids according to the invention are also suitable as dispersants for inorganic pigments and for preparing highly concentrated dispersions of solids (slurries).

A further object of the invention is the preparation of modified polyaspartic acids in which a) 0.1–99.9 mol-% of the previously mentioned educts are reacted with b) 99.9–0.1 mol-% of fatty acids, fatty acid amides, polybasic carboxylic acids, their anhydrides and amides, polybasic hydroxycarboxylic acids, their anhydrides and amides, polyhydroxycarboxylic acids, aminocarboxylic acids, saccharic acids, alcohols, polyols, amines, polyamines, alkoxylated alcohols and amines, aminoalcohols, aminosugars, carbohydrates, ethylenically unsaturated mono and polycarboxylic acids and their anhydrides and amides, protein hydrolysates, e.g. maize protein hydrolysate, soya protein hydrolysate, aminosulphonic acids and aminophosphonic acids, by the process according to the invention described above.

The educts described under a) are used at 0.1 to 99.9 mol-%, preferably 60 to 99.9 mol-% and in particular 75 to 99.9 mol-% in the polymerisation according to the invention.

Component (b) in the polymer may be any fatty acid. They may be saturated or ethylenically unsaturated. Examples are formic acid, acetic acid, propionic acid, butyric acid, lauric acid, palmitic acid, stearic acid, oleic acid, linoleic acid, linolenic acid, sorbic acid, myristic acid, undecanoic acid and any naturally occurring fatty acid mixtures, for example $C_{12}/C_{14}$ or $C_{15}/C_{18}$ fatty acid mixtures. As unsaturated fatty acids, acrylic acid and methacrylic acid may also be used.

Furthermore, these acids may also be used in the form of their amides. Examples of polybasic carboxylic acids which may be used are oxalic acid, succinic acid, glutaric acid, adipic acid, malonic acid, suberic acid, aconitic acid, itaconic acid, sulphosuccinic acid, alkylenesuccinic acids ($C_1-C_{26}$), 1,2,3-propane-tricarboxylic acid, butane-tetracarboxylic acid, furan-dicarboxylic acid or pyridine-dicarboxylic acid. The anhydrides of polybasic carboxylic acids, e.g. succinic anhydride, itaconic anhydride, aconitic anhydride and phthalic anhydride may also be used. Polybasic hydroxycarboxylic acid and polyhydroxycarboxylic acids may also be considered as component (b). Polybasic hydroxycarboxylic acids carry, in addition to at least one hydroxy group, at least two or more carboxyl groups. Examples of these which may be mentioned here are malic acid, tartaric acid, racemic acid, citric acid and isocitric acid.

Monobasic polyhydroxycarboxylic acids carry, in addition to one carboxylic group, two or more hydroxyl groups, e.g. glyceric acid, dimethylolpropionic acid, dimethylolbutyric acid and gluconic acid. In addition, monohydric alcohols with for example 1 to 22 carbon atoms, such as methanol, ethanol, n-propanol, i-propanol, butanol, pentanol, hexanol, octanol, lauryl alcohol, stearyl alcohol etc. are suitable. The alcohols may also optionally have a double bond, such as allyl alcohol or oleyl alcohol. Furthermore, these alcohols may be alkoxylated, with ethylene oxide or propylene oxide for example. Adducts consisting of 3 to 50 moles of ethylene oxide with fatty alcohols or oxoalcohols are of industrial interest. Furthermore, either saturated or unsaturated polyols may be used as component (b) such as, for instance, ethylene glycol, propylene glycol, butanediol, butenediol, glycerine, trimethylolpropane, pentaerythritol, sorbitol, neopentyl glycol and alkoxylated polyols such as polyethylene glycol, polypropylene glycol, ethoxylated trimethylolpropane, glycerine or pentaerythritol with molecular weights of up to 6000 may be used. In addition, amines such as $C_1-C_{22}$ alkylamines, e.g. methylamine, ethylamine, propylamine, butylamine, cyclohexylamine, octylamine, isooctylamine (ethylhexylamine), stearylamine, allylamine, oleylamine, ethylenediamine, diethylenetriamine, hexamethylenediamine, piperazine, diaminobutane, dimethylamine, diethylamine, hydroxylamine, hydrazine, ethanolamine, diethanolamine, aminopropanol, and polyalkylenamines such as polyethylenamine with molecular weights up to 6000 are also suitable as comonomer (b). The amines may also be alkoxylated, e.g. the addition products of 3 to 30 moles of ethylene oxide with fatty amines such as oleylamine, palmitylamine or stearylamine. Furthermore, amino-sugars such as aminosorbitol or glucosamine are also suitable. In addition, carbohydrates such as glucose, saccharose, maltose, dextrin, starch or sugar acids such as mucic acid, gluconic acid, glucuronic acid, glucaric acid, are also suitable as component (b). In addition, aminoacids, proteinogens such as glycine, alanine, glutaminic acid and lysine or non-proteinogens such as 4-aminobutyric acid, diaminosuccinic acid, 11-aminoundecanoic acid and 6-aminocaproic acid may be used as component (b). The compounds in component (b) are used in amounts of 0.1 to 99.9 mol-%, preferably 0.1 to 40 mol-%, in particular 0.1 to 25 mol-% for polymerisation. A single compound may be used as component (b) or mixtures of two or more compounds may be used as (b). The compounds in component (b) may be mixed in the desired ratio with one of the main educts (a) and used as a mixture in the first reaction stage.

In another embodiment, the compounds in component (b) are added to the reaction mixture shortly after mixing the main educts (a) in an earlier stage of the polymerisation. It is also possible to introduce components (b) to the mixing system simultaneously with the main educts (a).

If monofunctional compounds such as alcohols, amines, fatty acids or fatty acid amides are used as component (b), then they are incorporated at the ends of the chain. They act as chain-breakers and lower the molecular weight. Multifunctional compounds in component (b) may be incorporated in the final polymer both at the ends of the chain and also statistically distributed over the polymer chain.

The crude polymer may be freed of monomeric fractions by conventional working up methods, such as extraction with water and 1N hydrochloric acid or by membrane filtration. Analysis of the copolymers is performed by using $^{13}C$ and $^{15}N$ NMR spectroscopy, FTIR spectroscopy and after total hydrolysis by using HPLC, GC and GC-MS. In the case of polymerisation according to the invention, the polymer is produced primarily in the form of mostly water-insoluble modified polysuccinimides.

Modified polyaspartic acids are produced from the polysuccinimides, preferably by aqueous hydrolysis at 20° C. to 150° C. and at pH 7 to 12, optionally under pressure. This reaction, however, can also be performed at temperatures outside the stated range and at different pHs. suitable bases are alkali metal and alkaline earth metal hydroxides or carbonates such as, for example, caustic soda solution, caustic potash solution, soda or potassium carbonate, ammonia and amines such as triethylamine, triethanolamine, diethylamine, diethanolamine, alkylamines, etc. Partially or completely neutralised copolymers are obtained which contain 0.1 to 99.9 mol-% of aspartic acid copolymerised with 99.9 to 0.1 mol-% of at least one compound (b).

If primary amines or bases containing primary amine groups are used for hydrolysis, then the resulting amine salts can be converted into the corresponding amides by dehydration.

The elimination of water can be performed by heating to a temperature of 30° C. to 250° C., optionally supported by the presence of reduced pressure.

Modified polyaspartic acids prepared by the process according to the invention are classified as biodegradable in accordance with the "OECD Guidelines for testing of chemicals (1981)".

Modified polyaspartic acids according to the invention may be used as additives in low-phosphate and phosphate-free detergents and cleansing agents. The polymers are builders for detergents and act by reducing incrustation and greying of the textiles being washed, during the wash process.

Furthermore, polyaspartic acids according to the invention are suitable as water treatment agents. They may be added to the water in cooling circuits, evaporators or seawater desalination plants. In addition, they may be used as a coating inhibitor when boiling down sugar juice.

As a result of their good dispersant properties, modified polyaspartic acids according to the invention may also be used as dispersants for inorganic pigments and for preparing highly concentrated dispersions of solids (slurries).

The invention also relates to a process for preparing maleamic acid, characterised in that maleic anhydride or a derivative thereof (educt A) is mixed with ammonia, an ammonia-producing compound (educt B) in a high-speed mixing apparatus with a mixing time of <2 s, preferably in a jet mixer, and reacted in a reactor which is connected in series therewith, wherein the residence time and the temperature are selected so that no polymerisation, or almost no polymerisation, takes place.

It is already known that maleamic acid can be prepared by reacting maleic anhydride with ammonia in inert solvents. Thus, maleamic acid is obtained by introducing ammonia into a solution of maleic anhydride in xylene, ethylene chloride, tetralin or dioxan at 50° to 100° C. and isolating the precipitated amide acid by filtration (U.S. Pat. No. 2,459, 964/DE 847 287/JP 49 035 325/C. K. Sauers, R. J. Cotte, J. Org. Chem., 26, 6 (1961)). This solvent process has the disadvantage that, due to the large heat of reaction, dilute solutions have to be used, which involves the separation, working up and recycling of large amounts of solvent. Prerequisites for this process, moreover, are that the maleic anhydride contains no maleic or fumaric acid, the solvent and the ammonia gas used must be absolutely dry and moisture must be excluded during reaction. It is also disadvantageous that the formation of incrustations and blockages of the inlet pipe may occur at the inlet points for the ammonia gas during this process.

In German Patent no. 945 987, a process is described in which maleic anhydride is reacted with ammonia in the presence or absence of water to give maleamic acid. A variant of this comprises introducing powdered maleic anhydride into a cooled 21% strength ammonia solution. This has the disadvantage that, during addition and reaction, the mixture has to be externally cooled because otherwise there is significant hydrolysis of the maleic anhydride, and even below 10° C. the decrease in yield is quite considerable. The aqueous solution of the ammonium salt of maleic acid (a side product) has to be worked up after isolating the maleamic acid. Another variant comprises blowing gaseous ammonia through powdered maleic anhydride. In this case care has to be taken that thorough mixing takes place, which is linked with considerable technical problems for a gas/solid reaction. The gas must be introduced relatively slowly and here again external cooling must be applied. The maleic anhydride has to be used in finely powdered form, which is unsatisfactory from an occupational health aspect.

Soviet Patent SU 362821 describes the reaction of maleic anhydride with ammonia in a homogeneous vapour phase at temperatures of 215° to 350° C. in the absence of solvents and with contact times of 0.2 to 1.0 s. Maleamic acid is obtained with only about 70% purity so that in order to produce a pure product complicated subsequent purification is required which is associated with losses and polluted effluents.

The educts are preferably pre-mixed and reacted at a temperature of 20° C. to 250° C., preferably 60° C. to 200° C., to give maleamic acid. Exceeding the maximum temperature is preferably prevented by expanding and rapidly cooling the reaction mixture. In a preferred embodiment, the educts are molten maleic anhydride and an aqueous solution of ammonia or ammonia dissolved in an organic solvent. The residence time in the reactor is 0.1 to 200 s, preferably 0.1 to 60 s. The educts are again advantageously fed by a jet mixer which is directly connected to a reactor.

It has to be recognised as extremely surprising that maleamic acid can be obtained in quantitative yield and with high purity by spraying and rapidly mixing the starting component maleic anhydride, especially with aqueous ammonia solution, as it is known that maleamic acid is hydrolysed in the presence of water, even at low temperatures, with the formation of the ammonium salt of maleic acid. Rapid mixing combined with the high rate of reaction to give maleamic acid and rapid cooling of the reaction mixture means that sprayed maleic anhydride is not hydrolysed by water to give maleic acid.

The following advantages are produced by the invention:

The process according to the invention enables the simple preparation of maleamic acid in high yield and with high purity. The process can be performed without any great technical difficulty; subsequent purification stages are not required. Organic solvents, which have to be worked up again, are not used.

Industrial production permits a high throughput and the energy costs due to external heating or cooling are minimised, which leads to a considerable improvement in the operational efficiency of the process.

Maleamic acid prepared by the process according to the invention can be used as starting material for the production of polysuccinimide (J. Org. Chem., 24, 1662–1666 (1959)), which in its turn is a valuable starting material for polyaspartic acid and its salts. The latter is widely used in detergents, dispersants and formulating aids.

Maleamic acid is also used as the starting material for alkyl-β-cyanoacrylates (J. Org. Chem., 26, 6 (1961)), which in their turn have a variety of applications, e.g. as active intermediates (U.S. Pat. Nos. 2,437,231, 2,531,408, 2,850, 486 and 2,850,487).

In the following the invention is explained in more detail by means of working examples and drawings.

These show

FIG. 1: A process flow sheet for the largely adiabatic preparation of polysuccinimide FIG. 2: A process flow sheet for the preparation of polyaspartic acid FIG. 3: A process flow sheet for the preparation maleamic acid According to FIG. 1, educt A consisting of maleic anhydride or a derivative of maleic anhydride is fed via metering pump 1 to a jet mixer 2 with tubular reactor 3 connected in series. Educts A, B can also be interchanged at jet mixer 2. At the same time, using metering pump 4, educt B is introduced into jet mixer 2. At the nozzle outlet there is immediate intensive mixing of educts A and B. The exothermic reaction between educts A and B is initiated at the same time. This reaction then continues in the subsequent downstream tubular reactor 3, wherein a nitrogen-containing low molecular derivative of maleic acid is produced in the first reaction stage. The heat of reaction released in this reaction stage is now utilised to polymerise the nitrogen-containing low molecular derivative to give a polymer with repeating succinyl units in a second reaction stage which follows immediately and which also takes place in tubular reactor 3. Thus, the educts are mixed in jet mixer 2 and the exothermic reaction in the first reaction stage is so rapid that essentially no heat is given out to the surroundings, i.e. the reaction to give the nitrogen-containing low molecular derivative of maleic acid takes place largely adiabatically. The polymer obtained, e.g. polysuccinimide, can be fed directly from tubular reactor 3 to spray-dryer 5 for drying, the final free-flowing product being withdrawn at discharge point 7. Steam and gas are removed via connection piece 6. An orifice 8 or other obstructions can be incorporated in tubular reactor 3 to set the reaction pressure. The reaction temperature for given educts can be accurately controlled by the pressure and optionally by simultaneous additional heating or cooling. In addition, tubular reactor 3 in the form of a paddle reactor can be fitted with recycling pipeline 9 which has a feed pump 10 and a heat exchanger 19. More solvent (water, organic solvent or supercritical gas such as $CO_2$) can optionally be added in recycling pipeline 9 to lower the viscosity of the mixture. In one variant of the process according to the invention, an MPSR may be used instead of tubular reactor 3.

A further variant of the process comprises setting the reaction conditions, in particular the temperature and residence time in tubular reactor 3, so that the product emerging from tubular reactor 3 is still not completely polymerised. In principle, the residence time in the tubular reactor can be adjusted via the rate of flow (throughput), the gradient of the spiral tube in an MPSR and the overall length of the tubular reactor, while the temperature can effectively be set via the reactor pressure and/or the cooling/heating medium and/or the amount of solvent/water to be evaporated. In the case of incomplete polymerisation, the reaction product in this variant of the process can optionally be fed to high viscosity reactor 12 via pipeline 11 and the polymerisation process can be completed there. The pasty or powdery product emerging from the high viscosity reactor is then optionally dried in a known manner (dryer 13). A continuously operated, self-cleaning co-rotating twin screw machine fitted with a hollow shaft is used, for instance, as a high viscosity reactor. In this process variant, the reaction conditions are expediently adjusted in such a way that the product emerging from tubular reactor 3 or an MPSR is 5 to 95%, preferably at least 20%, in particular more than 50% converted to a pre-polymer. Polymerisation is then completed in high viscosity reactor 12

Water or an organic solvent or a supercritical gas such as $CO_2$ may be used as solvent for nitrogen-containing educt B, this being largely vaporised due to the exothermic character of the first reaction stage in tubular reactor 3 or MPSR. The reaction can be performed without any problem in such a way that 50 to 99% of the solvent (water, organic solvent or supercritical gas such as $CO_2$) is vaporised in tubular reactor 3 or MPSR. The reaction temperature in tubular reactor 3 or MPSR can be adjusted via the amount of solvent and the pressure.

Figure 2:
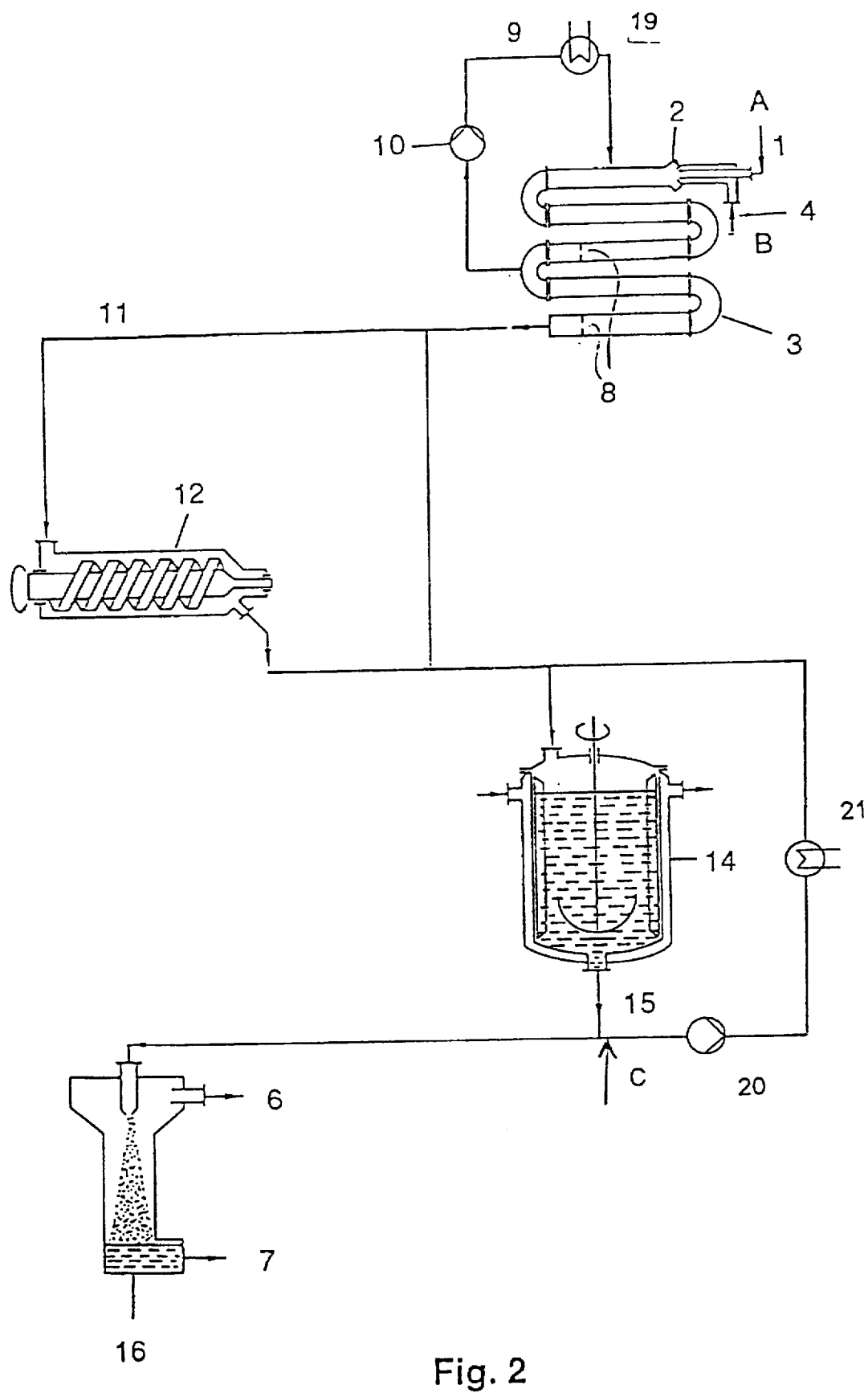

Polysuccinimide prepared by the process according to FIG. 1 can be hydrolysed further to give polyaspartic acid by the process shown in FIG. 2. For this purpose, the completely polymerised product from tubular reactor 3 or MPSR is passed directly into a suitable hydrolysis device 14, whereas in the process with incomplete polymerisation, the product emerging from high viscosity reactor 12 is fed to device 14 mentioned above. Hydrolysis in the device 14 mentioned above takes place in a known manner by adding a base C at temperatures between 20° C. and the boiling point of the polyaspartic acid-containing suspension, optionally under pressure. A preferred embodiment of hydrolysis device 14 is a forced circulation reactor with externally/ internally located heat exchangers 21 for efficient temperature management and gentle hydrolysis of the polymers with repeating succinyl units. The circulation circuit for the base-containing product solution can be fed to the terminal connector in the tubular reactor or MPSR for the purpose of intensive mixing. The base is preferably fed to the suction side of circulation pump 20 which is suitable for intensive mixing. The finally produced polyaspartic acid is withdrawn at outlet 15 of device 14 mentioned above and then optionally fed to another reactor. It is then dried in spray-dryer 16 which is connected in series.

Figure 3:
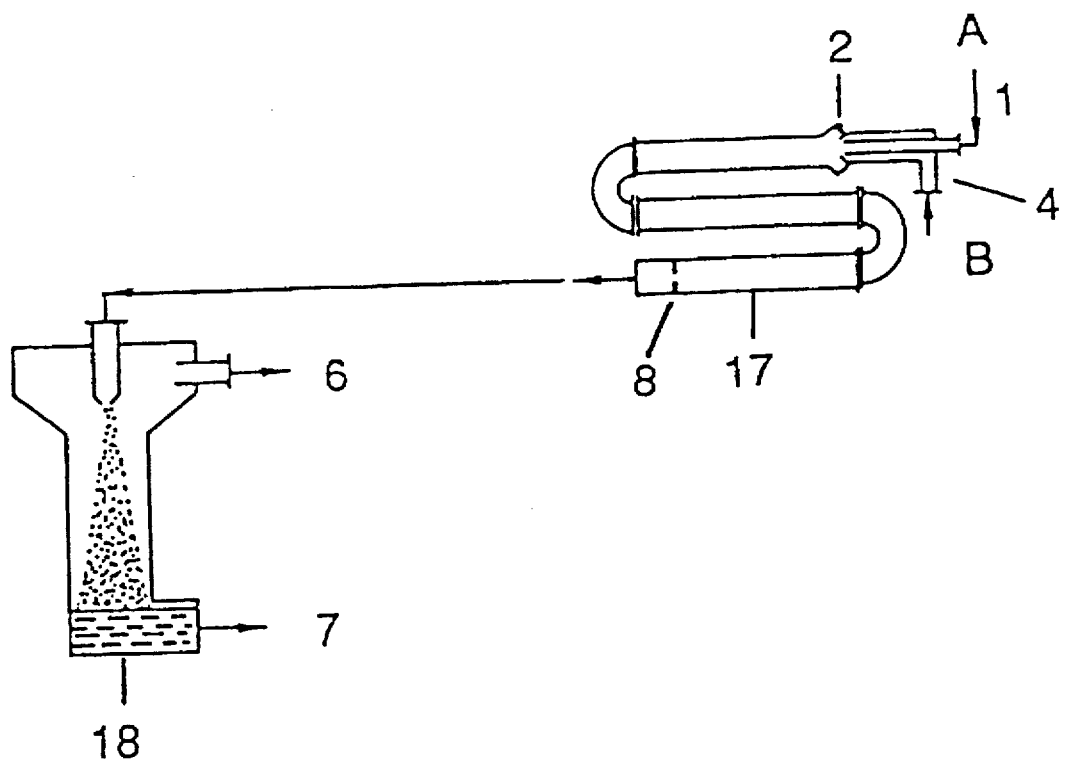

A similar method of working is utilised in the process according to FIG. 3 to make maleamic acid. In this case, the reaction conditions in reactor 17 are intentionally selected so that at best a small proportion of educts A and B is polymerised. In practice, therefore, reactor 17 is designed to be shorter and is cooled (externally and/or as a result of evaporation) in order to inhibit polymerisation. The reaction product (maleamic acid) is dried, in a spray-dryer for instance, in the same way as in the first described process variant in accordance with FIG. 1.

The process parameters and reaction conditions maintained during the process according to FIGS. 1–3 are explained in more detail in the following, using working examples.

EXAMPLES

The following examples were performed in a reactor system comprising a jet mixer 2 with a smoothing jet nozzle structure and a subsequent tubular reactor 3 or MPSR. Thermal polymerisation was optionally completed in a continuously operated, self-cleaning, co-rotating twin screw machine 12 fitted with a hollow shaft. In the examples, molten maleic anhydride was introduced with 25 or 50% strength ammonia solution by means of a smoothing jet nozzle and then rapidly mixed in tubular reactor 3 or MPSR. Tubular reactors of different lengths with an internal diameter of 15 mm had an orifice fitted at the end of the tube in order to be able to regulate the reactor pressure via the pressure drop. As a result of the type of construction, the reactor pressure was approximately the same as the pressure of the ammonoa being introduced. Beyond constriction 8, the reaction mixture was expanded to atmospheric pressure and flowed through a retention tube either in screw machine 12 for thermal polymerisation or directly into hydrolysis container 14 which was connected in series.

Example 1

Molten maleic anhydride at 80° C. was mixed with cold 25 wt. % strength aqueous ammonia solution at 8° C. via a smoothing jet nozzle with a 0.4 mm nozzle cross-section and metered into the tubular reactor which was connected in series. After a reaction zone length of 10 cm, an orifice with an internal diameter of 0.75 mm was screwed into the tube to maintain the pressure. The reaction zone was connected in series with a 1 m long retention tube. The maleic anhydride melt was introduced into the reaction zone at 28 bar and with a mass flow of 15.7 kg/h through the smoothing jet nozzle. The aqueous ammonia solution was introduced at 20 bar at a rate of 11.4 kg/h. The temperature in the reaction zone was 110° to 180° C. On expanding beyond the orifice, only a little water evaporated so there was only a negligible drop in temperature. The viscous liquid mixture, already preconcentrated by partial evaporation of water, was then polymerised at 170° to 175° C. in a heatable double-shaft co-rotating twin screw machine with a residence time of 10 minutes. A coarse granular to powdery, pink to orange-coloured, product was obtained in this way.

The analytical results are given in Table 1.

Example 2

The tubular reactor provided with a smoothing jet nozzle as jet mixer was again used. Molten maleic anhydride at 85° C. was mixed with cold 25 wt. % strength aqueous ammonia solution at 6° C. via a smoothing jet nozzle with a 0.7 mm nozzle cross-section and metered into the tubular reactor. After a reaction zone length of 6 cm, the orifice with an internal diameter of 0.75 mm was placed in the tube to maintain the pressure. The retention tube following the reaction zone was shortened to 40 cm. The residence time in the reaction zone was thus about 0.4 s. With the shortened retention tube after the reaction zone, the total residence time was only about 1.6 s. The maleic anhydride melt was introduced to the reaction zone under a pressure of 36 bar and with a mass flow of 45.8 kg/h through the smoothing jet nozzle. The aqueous ammonia solution was metered into the reaction zone at 30 bar and 34.3 kg/h. The temperature in the reaction zone was about 185° C. On expanding beyond the orifice, the temperature dropped to about 135° C. due to the evaporation of water. The viscous liquid mixture, pre-concentrated in this way, was then further polymerised at 170° to 175° C. in a heatable, double-shaft, co-rotating twin screw machine with a residence time of 10 minutes. A coarse granular to powdery, pink to orange-coloured, product was also obtained. The analytical results are given in Table 1.

Example 3

The test was performed in the same apparatus and under the same conditions as in example 1.

Molten maleic anhydride at 75° C. was mixed with cold 25 wt. % aqueous ammonia solution at 7° C. via a smoothing jet nozzle with a 0.4 mm nozzle cross-section and metered into the tubular reactor. After a reaction zone length of 10 cm, an orifice with an internal diameter of 0.75 mm was screwed into the tube to maintain the pressure. A 1 m long tube was used as the subsequent retention tube. The maleic anhydride melt was introduced into the reaction zone under a pressure of 25 bar and with a mass flow of 12.8 kg/h through the smoothing jet nozzle. The aqueous ammonia solution was metered into the reaction zone at 20 bar and 17.7 kg/h. The temperature in the reaction zone and after expansion was also 110° to 180° C. The viscous liquid mixture, already pre-concentrated by partial evaporation of water, was then directly polymerised at 170° to 175° C. in the heatable, double-shaft, co-rotating twin screw machine with a residence time of 10 minutes. A coarse granular orange solid was obtained.

The analytical results are given in table 1.

TABLE 1

| | Analytical results: Examples | | | | | | |
|---|---|---|---|---|---|---|---|
| | 1 | 2 | 3 | 4 | 5 | 6 | 7 |
| Ratio MA:NH$_3$ | 1:1 | 1:1 | 1:2 | 1:1 | 1:1 | 1:1 | 1:1[1] |
| Reaction nozzle/ product yield [kg/h] | 26.5 | 77.5 | 28.5 | 55.0 | 56 | — | — |
| Product composition | | | | | | | |
| C | 28.9 | 29.0 | 22.3 | 39.0 | 38.3 | — | — |
| N | 10.7 | 10.9 | 15.1 | 10.9 | 10.6 | — | — |
| NH$_4$ | 7.6 | 8.3 | 11.5 | 2.9 | 1.4 | — | — |
| H$_2$O | 22.7 | 21.0 | 38.0 | 15.5 | 16.5 | — | — |
| Polymerisation | | | | | | | |
| Product composition | PSI | PSI | PSI | PSI | | PAA[2] | PAA[2] |
| C | 47.2 | 47.5 | 42.8 | 47.5 | — | 30.2 | 32.4 |
| H | 3.8 | 3.9 | 4.5 | 9.8 | — | 3.6 | 4.2 |
| N | 14.0 | 13.8 | 22.2 | 14.1 | — | 7.9 | 9.6 |
| NH$_4$ | 1.3 | 1.0 | 0.9 | 1.1 | — | <0.1 | 0.4 |
| H$_2$O | 0.4 | 0.5 | 0.6 | 0.5 | — | 8.9 | 5.9 |
| Molecular weight from GPC[3] | | | | | | | |
| Mw | 2950 | 3025 | — | 3075 | — | 3000 | 2950 |
| Acid value [mg NaOH/g PSI] | 412 | 404 | — | 410 | — | — | — |

[1] Urea
[2] Na salt of polyaspartic acid
[3] The molecular weight distribution was determined after conversion into the sodium salt, by gel permeation chromatography (GPC) by measuring against calibration standards. The calibration standards were sodium salts of polyaspartic acid of known molecular weight from the Sigma Co. There is no molecular weight distribution given in the data for example 3 due to the lack of a calibration standard.

The structure of the polymerisation products prepared in examples 1–3 were investigated using $^{13}$C NMR and FTIR. It was thus found that the products in examples 1 and 2 consisted of mainly polysuccinimide. As secondary components, small proportions of polyaspartic acid were found. In example 3, the product consisted largely of polyasparagine and contained only small proportions of polysuccinimide. The sodium salt of polyaspartic acid can, however be prepared from that by alkaline hydrolysis. GPC analysis of the hydrolysis product gave an average molecular weight of 2900.

Example 4

The tubular reactor provided with a smoothing jet nozzle as a jet mixer was again used. Molten maleic anhydride at 82° C. was mixed with cold 50 wt. % strength aqueous ammonia solution at 9° C. via a smoothing jet nozzle with a nozzle cross-section of 0.7 mm and metered into the tubular reactor. After a reaction zone length of 15 cm, an orifice with an internal diameter of 0.9 mm was inserted in the tube to maintain the pressure. The subsequent retention tube was 40 cm long. The maleic anhydride melt was introduced to the reaction zone under a pressure of 72 bar and with a mass flow of 44.4 kg/h through the smoothing jet nozzle. The aqueous ammonia solution was metered into the reaction zone at 65 bar and 14.8 kg/h. The temperature in the reaction zone was 250° to 275° C. On expanding beyond the orifice, the temperature dropped to about 230° C. due to evaporation of water. The viscous liquid obtained in this way was a yellow-orange aqueous melt solution which was viscous at 140° C. and solidified to a plastic material on cooling to room temperature. Analysis of this melt solution showed that actual polymerisation had already started. An average molecular weight Mw of 1150 was found by GPC measurement.

The melt solution was then subjected to further polymerisation at 170° to 175° C. in a heatable, double-shaft, co-rotating twin screw machine with a residence time of 10 minutes. A powdery, pink to orange-coloured product was again obtained.

The analytical results are given in Table 1.

Example 5

The tubular reactor with a smoothing jet nozzle provided as jet mixer was again used. Molten maleic anhydride at 70° C. was mixed with cold 50 wt. % strength aqueous ammonia solution at 5° C. via a smoothing jet nozzle with a 0.7 mm nozzle cross-section and metered into the tubular reactor. After a reaction zone length of 50 cm, an orifice with an internal diameter of 1.1 mm was now inserted in the tube to maintain the pressure. The retention tube following the reaction zone again had a length of 40 cm. The maleic anhydride melt was introduced to the reaction zone through the smoothing jet nozzle under a pressure of 68 bar with a mass flow of 50.2 kg/h. The aqueous ammonia solution was metered into the reaction zone at 58 bar and 15.7 kg/h. The again obtained.

The analytical results are given in Table 1.

Example 5

The tubular reactor with a smoothing jet nozzle provided as An orange-red melt solution which had a molecular weight Mw of 1700 according to GPC measurement was obtained. By adding water, a pale red solid could be precipitated and separated from this melt solution, this consisting of PSI. The average molecular weight was 2700. The polysodium salt obtainable from this melt solution by alkaline hydrolysis had good sequestering and dispersant properties so, for at least some applications, it is not necessary to proceed to further polymerisation in a high viscosity reactor. The analytical results are given in Table 1.

Example 6

In this example, an MPSR provided with a smoothing jet nozzle as a jet mixer and without a connected high viscosity reactor was used. Molten maleic anhydride at 100° C. was mixed with cold 40 wt. % strength aqueous ammonia solution at 7° C. via a smoothing jet nozzle with a 0.35 mm An orange-red melt solution which had a molecular weight Mw of 1700 according to GPC measurement was obtained. By adding water, a pale red solid could be precipitated and separated from this melt solution, this consisting of PSI. cm led from the MPSR to a 50 l stirred tank connected in series, in which 20 kg of water were initially placed. The molten maleic anhydride was introduced to the reaction zone through the smoothing jet nozzle under a pressure of 40 bar with a mass flow of 25.4 kg/h. The aqueous ammonia solution was metered into the reaction zone at 16.5 bar and 11.0 kg/h. The temperature in the reaction zone was 220° to 235° C. Following expansion beyond the orifice the temperature dropped to only about 210° C. due to evaporation of water. The hot mixture was passed to the receiving tank which was maintained at 60° C. and 45 wt. % strength caustic soda solution was added, wherein the pH was held at about 9.5 by a control system. An orange-red aqueous PAA solution was obtained. The isolated solid, the sodium salt of polyaspartic acid, had an average molecular weight Mw of 3000, according to GPC measurement. The product had good sequestering and dispersant properties.

Example 7

The tubular reactor provided with a smoothing jet nozzle as jet mixer was again used without a connected high viscosity reactor. Molten maleic anhydride at 130° C. was mixed with a hot 75 wt. % aqueous urea solution at 90° C. via a smoothing jet nozzle with a 0.35 mm nozzle crosssection and metered into the tubular reactor. After a reaction zone length of 290 cm, an orifice with an internal diameter of 2.1 mm was inserted in the tube to maintain the pressure. A retention tube with a length of 40 cm led to a 50 l stirred tank connected in series, in which 20 kg of water were initially placed. The maleic anhydride melt was introduced to the reaction zone under a pressure of 40 bar with a mass flow of 25.4 kg/h (259 mol/h) through the smoothing jet nozzle. The aqueous urea solution was metered into the reaction zone at 26.5 bar and 20.70 kg/h (259 mol/h). The temperature in the reaction zone was 210° to 225° C. Following expansion beyond the orifice, the temperature dropped to about 200° C. due to evaporation of water. At the same time, excess ammonia and carbon dioxide formed during the reaction were removed. The hot mixture was taken to the receiving tank which was maintained at 60° C. and 45 wt. % strength caustic soda solution was added, wherein the pH was maintained at about 9.5 by a control system. An orange-red aqueous PAA solution was obtained. The isolated solid, the sodium salt of polyaspartic acid, had an average molecular weight Mw of 2950, according to GPC. The product had good sequestering and dispersant properties. The analytical results are given in Table 1.

Example 8

4.66 kg (64.8 mol) (25 mol-% with respect to maleic anhydride) of acrylic acid were dissolved as the ammonium salt in 13.8 kg of 40% aqueous ammonia with the addition of an inhibitor (e.g. hydroquinone, 2,5-ditertiarybutylphenol, methylphenol, N-phenyl-β-naphthylamine, etc.). This mixture is used in the reaction instead of the pure ammonia solution. Again the tubular reactor with a smoothing jet nozzle as a jet mixer, without a connected high viscosity reactor, was used. Molten maleic anhydride at 100° C. was mixed with cold acrylic acid-containing mixture at 15° C. via a smoothing jet nozzle with a 0.35 mm nozzle crosssection and metered into the tubular reactor. After a reaction zone length of 290 cm, an orifice with an internal diameter of 2.1 mm was now inserted in the tube. A retention tube with a length of 40 cm led to a 50 l stirred tank connected in series, in which 20 kg of water were initially placed. The maleic anhydride melt was introduced into the reaction zone through the smoothing jet nozzle under a pressure of 40 bar with a mass flow of 25.4 kg/h. The aqueous mixed solution was metered into the reaction zone at 18.5 bar and 18.6 kg/h. The temperature in the reaction zone was 220° to 235° C. Following expansion beyond the orifice, the temperature dropped to about 200° C. due to evaporation of water. The hot mixture was placed in a paddle screw, where solidification of the product occurred due to evaporation of the remaining water. An orange-red solid was obtained. Unconverted educts were removed by washing several times with water. After total hydrolysis, β-alanine units were found in the isolated polymer in addition to aspartic acid units. The copolymer has an average molecular weight Mw of 2200 according to GPC.

Example 9

3.8 kg (25.8 mol) (10 mol-% with respect to maleic anhydride) of glutamic acid are dissolved in 12.1 kg of 40% strength ammonia solution as the ammonium salt. This mixture is used in the reaction instead of the pure ammonia solution. Again, the tubular reactor provided with a smoothing jet nozzle as a jet mixer, without a connected high viscosity reactor, was used. Molten maleic anhydride a paddle screw, where solidification of the product occurred due to evaporation of the remaining water. An orange-red solid was obtained. Unconverted educts were removed by washing several times with water. After total with an internal diameter of 2.1 mm was now inserted in the tube. A retention tube with a length of 40 cm led to a 50 l stirred tank connected in series, in which 20 kg of water were initially placed. The maleic anhydride melt was introduced to the reaction zone through the smoothing jet nozzle under a pressure of 40 bar and with a mass flow of 25.4 kg/h. The aqueous mixed solution was metered into the reaction zone at 18.6 bar and 15.9 kg/h. The temperature in the reaction zone was 220° to 230° C. On expanding beyond the orifice, the temperature dropped to about 200° C. due to the evaporation of water. The hot mixture was placed in a paddle screw, where the product solidified due to evaporation of the remaining water. An orange-red solid was obtained. Unconverted educts were removed by washing several times with water and 1N hydrochloric acid. After total hydrolysis, glutamic acid units were found in the isolated polymer in addition to aspartic acid units. The copolymer had an average molecular weight of 2600 according to GPC.

Working examples for the preparation of maleamic acid

Example 10

In this case a reactor system consisting of a jet mixer and a tubular reactor was used. Molten maleic anhydride at 80°

C. was mixed with cold 25 wt. % strength aqueous ammonia solution at 8° C. via a smoothing jet nozzle with a 0.4 mm nozzle cross-section and metered into the tubular reactor connected in series. After a reaction zone length of 10 cm an orifice with an internal diameter of 0.75 mm was screwed into the tube to maintain the pressure. Following the reaction zone was a retention tube of 1 m length, before the product mixture was collected in a receiving tank. The maleic anhydride melt was introduced into the reaction zone through the smoothing jet nozzle at a pressure of 28 bar with a mass flow of 15.7 kg/h. The aqueous ammonia solution was metered into the reaction zone at 20 bar and 11.4 kg/h. The temperature in the reaction zone was 110° to 180° C. Following expansion beyond the orifice, there was very little evaporation of water and thus a small drop in temperature. Maleamic acid in the form of white crystals was isolated as the product. The melting point was 170° to 172° C. and the purity was 98%. The yield after a ten minute trial was 2.98 kg of maleamic acid, i.e. 98.8% of the theoretical.

Example 11

A reactor system provided with a jet mixer and a subsequent tubular reactor was again used. Molten maleic acid at 85° C. was mixed with cold 25 wt. % strength aqueous ammonia solution at 6° C. via a smoothing jet nozzle with a 0.7 mm nozzle cross-section. After a reaction zone length of 6 cm, the orifice with an internal diameter of 0.75 mm was left in the tube to maintain the pressure. The retention tube following the reaction zone was shortened to 0.4 m. The maleic anhydride melt was introduced into the reaction zone through the smoothing jet nozzle at a pressure of 36 bar and a mass flow of 45.8 kg/h. The aqueous ammonia solution was metered into the reaction zone at 30 bar and 34.3 kg/h. The temperature in the reaction zone was about 185° C. On expanding beyond the orifice, the temperature dropped to about 135° C. due to evaporation of water. Maleamic acid was obtained in 97% yield and purity. The melting point was 169° to 172° C.

We claim:

1. A process for the continuous preparation of polymers with repeating succinyl units, in which maleic anhydride, maleic acid, malic acid or fumaric acid, or mixtures thereof, (educt A) is mixed with ammonia, ammonium hydrogen carbonate, diammonium carbonate, isourea (ammonium cyanate), ammonium salts of carbonic acid or amides of carbonic acid, or mixtures thereof, (educt B) and are reacted in a first exothermic reaction stage to give a nitrogen-containing low molecular derivative of maleic acid and this derivative is polymerized in a subsequent second reaction stage, characterised in that the educts A and B are fed to a jet mixer having a nozzle containing an inner tube and an outer tube wherein said inner tube has an external surface and said inner tube is contained within said outer tube so that the external surface of said inner tube defines an annular passageway within said outer tube, simultaneously feeding one of the educts through the inner tube and the other educt through the annular passageway within the outer tube so that when said educts exit the inner tube and the annular passageway within said outer tube, said educts are intensively mixed and exothermically reacted in the jet mixer to form a reaction mixture;

discharging the reaction mixture from the jet mixer into a tubular reactor which is connected downstream and in series with the jet mixer;

conveying the reaction mixture through the tubular reactor as the exothermic reaction continues to form a nitrogen-containing low molecular derivative of maleic acid in a first reaction stage and a polymer with repeating succinyl units in a second reaction stage which also takes place in the tubular reactor, wherein the heat of reaction which is released in the exothermic reaction in the first reaction stage is used to take the reaction mixture to polymerization temperature for at least partially polymerizing the nitrogen-containing low molecular derivative of maleic acid in the second reaction stage within the tubular reactor to obtain the polymer with repeating succinyl units.

2. A process according to claim 1, wherein educt A is maleic anhydride, maleic acid or fumaric acid or mixtures of the same.

3. A process according to claim 1, wherein educt B is at least one compound selected from the group consisting of ammonia, ammonium hydrogen carbonate, diammonium carbonate, urea, isourea (ammonium cyanate), carbamic acid and ammonium carbamide.

4. A process according to claim 3, wherein educt B is added to educt A in the pure form or dissolved in an organic solvent and/or water.

5. A process according to claim 4, wherein the heat released in the first and second reaction stages is used to at least partially evaporate the organic solvent and/or any water that is present in the reaction mixture.

6. A process according to claim 4, wherein the reaction temperature is adjusted by controlling the amount of organic solvent or water that is present in the reaction mixture.

7. A process according to claim 1, wherein the reaction temperature is adjusted by recycling a portion of the reaction mixture from one section of said tubular reactor through a heat exchanger to an upstream section of said tubular reactor during said second reaction stage.

8. A process according to claim 1, wherein at least one substance selected from the group consisting of maleic anhydride, maleic acid, fumaric acid or malic acid is mixed in molten form with a solution containing ammonia, ammonium hydrogen carbonate, diammonium carbonate, ammonium salts of carbonic acid or amides of carbonic acid, or mixtures thereof.

9. A process according to claim 8, wherein the solution contains a polar aprotic solvent.

10. A process according to claim 8, wherein the solution contains a solvent selected from the group consisting of dimethylformamide, an N-alkylpyrrolidone, sulpholane or a supercritical gas.

11. A process according to claim 10, wherein the supercritical gas is $CO_2$.

12. A process according to claim 1, wherein the molar ratio of nitrogen in educt B relative to maleic anhydride, maleic acid, malic acid or fumaric acid in educt A is adjusted to a value between 1.0 and 5.0.

13. A process according to claim 1, wherein the molar ratio of nitrogen in educt B relative to maleic anhydride, maleic acid, malic acid or fumaric acid in educt A is adjusted to a value between 0.5 and 4.0.

14. A process according to claim 1, wherein the jet mixer has a mixing time of less than 2 s and the exothermic reaction of the educts A and B in the first reaction stage takes place in less than 60 s.

15. A process according to claim 14, wherein the jet mixer is connected in series to a multi-phase spiral tube reactor.

16. A process according to claim 1, wherein the educts A and B are mixed and reacted at temperatures between 0° C.

and 200° C. in the first reaction stage and the exothermic reaction in the first reaction stage supplies sufficient heat for the second reaction stage to be performed at temperatures of 120° C. to 500° C.

17. A process according to claim 16, wherein the reaction temperature in the tubular reactor is adjusted via the pressure in the reactor and the mass flow of the educts A and B.

18. A process according to claim 16, wherein the jet mixer is connected in series to a multi-phase spiral tube reactor and the jet mixer has a mixing time of less than 2 s, further wherein the exothermic reaction of the educts A and B in the first reaction stage takes place in less than 60 s and the total residence time of the educts A and B and the reaction mixture in the first and second reaction stages at temperatures between 120° C. and 200° C. is less than 30 minutes, at temperatures between 200° C. and 250° C. is less than 10 minutes, at temperatures between 250° C. and 300° C. is less than 5 minutes and at temperatures above 300° C. is less than 1 minute.

19. A process according to claim 1, wherein the repeating succinyl units contain at least one of the following structures:

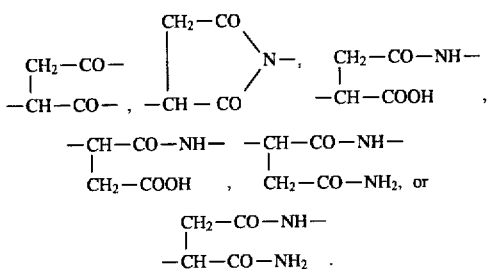

20. A process according to claim 1, wherein educts A and B, are reacted to give a succinyl unit-containing polymer with repeating units of at least one structure selected from the group consisting of:

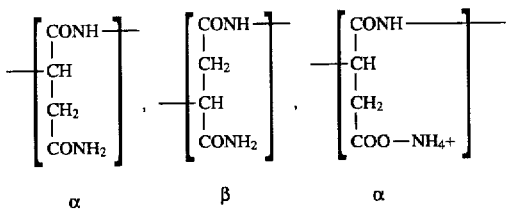

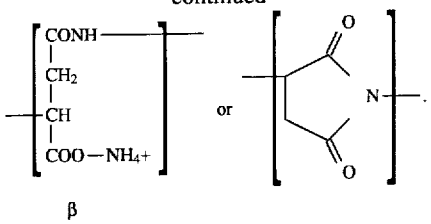

21. A process according to claim 20, wherein 1.8 to 25 moles of educt B are used per mole of educt A.

22. A process according to claim 1, wherein in addition to the educts A and B, at least one other compound selected from the group consisting of alcohols, dicarboxylic acids, polycarboxylic acids, unsaturated monocarboxylic acids, unsaturated dicarboxylic acids, unsaturated polycarboxylic acids, aminocarboxylic acids, polyaminocarboxylic acids, fatty acids, sugars or amines, are continuously added in the first reaction stage.

23. A process according to claim 22, wherein the at least one other compound is mixed with educts A and B in the jet mixer.

24. A process according to claim 22, wherein the at least one other compound is added to the reaction mixture in the tubular reactor during the first reaction stage.

25. A process according to claim 22, wherein 0.1 to 99.9 mol-% of the educts A and B are reacted with 99.9 to 0.1 mol-% of the at least one other compound.

26. A process according to claim 25, wherein 60 to 99.9 mol-% of the educts A and B are reacted with 40 to 0.1 mol-% of the at least one other compound.

27. A process according to claim 25, wherein 75 to 99.9 mol-% of the educts A and B are reacted with 25 to 0.1 mol-% of the at least one other compound.

28. A process according to claim 1, wherein the resulting polymer is hydrolysed to the corresponding acid form.

29. A process according to claim 28, wherein hydrolysis is performed by adding a base.

30. A process according to claim 28, wherein hydrolysis is performed at temperatures between 20° C. and the boiling point of the hydrolysis suspension and at a pH of 5 to 14.

31. A process according to claim 1, wherein an amount of educt A or educt B which is in addition to the amounts of educts A and B that are discharged from the jet mixer into the tubular reactor is added at at least one point of introduction along the tubular reactor.

* * * * *

UNITED STATES PATENT AND TRADEMARK OFFICE
CERTIFICATE OF CORRECTION

PATENT NO. : 5,594,077
DATED : January 14, 1997
INVENTOR(S) : Groth et al

It is certified that error appears in the above-identified patent and that said Letters Patent is hereby corrected as shown below:

On the cover page, in section [56] References Cited, U.S. PATENT DOCUMENTS, "5,211,733" should be --5,221,733--.

In Column 20, line 55 (Claim 12), "1.0" should be --0.1--.

Signed and Sealed this

Ninth Day of December, 1997

Attest:

BRUCE LEHMAN

Attesting Officer

Commissioner of Patents and Trademarks